US012609303B2

(12) United States Patent
Park et al.

(10) Patent No.: US 12,609,303 B2
(45) Date of Patent: Apr. 21, 2026

(54) ANODE ACTIVE MATERIAL FOR LITHIUM SECONDARY BATTERY AND METHOD OF PREPARING THE SAME

(71) Applicants:SK INNOVATION CO., LTD., Seoul (KR); UNIST (ULSAN NATIONAL INSTITUTE OF SCIENCE AND TECHNOLOGY), Ulsan (KR)

(72) Inventors: Gwi Ok Park, Daejeon (KR); Joon Sup Kim, Daejeon (KR); Eun Jun Park, Daejeon (KR); Jee Hee Lee, Daejeon (KR); Jae Phil Cho, Ulsan (KR)

(73) Assignees: SK On Co., Ltd., Seoul (KR); UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 490 days.

(21) Appl. No.: 17/535,938

(22) Filed: Nov. 26, 2021

(65) Prior Publication Data

US 2022/0166013 A1 May 26, 2022

(30) Foreign Application Priority Data

Nov. 26, 2020 (KR) ........................ 10-2020-0160801

(51) Int. Cl.
    *H01M 4/38* (2006.01)
    *H01M 4/02* (2006.01)
    (Continued)

(52) U.S. Cl.
    CPC ......... *H01M 4/386* (2013.01); *H01M 4/0428* (2013.01); *H01M 4/0471* (2013.01);
    (Continued)

(58) Field of Classification Search
    CPC .. H01M 4/386; H01M 4/0428; H01M 4/0471; H01M 4/366; H01M 4/48; H01M 4/583; H01M 10/0525; H01M 2004/021
    See application file for complete search history.

(56) References Cited

U.S. PATENT DOCUMENTS

2012/0328952 A1* 12/2012 Yushin .................. H01M 4/625
                                                       977/773
2017/0170477 A1*  6/2017 Sakshaug .............. H01M 4/386
                        (Continued)

FOREIGN PATENT DOCUMENTS

CN      108511719 A  *  9/2018  ........ H01M 10/0525
KR   10-2019-0013457 A    2/2019

OTHER PUBLICATIONS

J. Yang et al., Amorphous TiO2 Shells: A Vital Elastic Buffering Layer on Silicon Nanoparticles for High-Performance and Safe Lithium Storage, Advanced Materials, Apr. 4, 2017, pp. 1-7, vol. 29, WILEY-VCH Verlag GmbH & Co. KGaA, Weinheim.

(Continued)

*Primary Examiner* — Ula C Ruddock
*Assistant Examiner* — Olivia Mason Ruggiero
(74) *Attorney, Agent, or Firm* — IP & T GROUP LLP

(57) ABSTRACT

Provided are an anode active material for a lithium secondary battery and a method of preparing the same, wherein the anode active material for a lithium secondary battery includes a silicon-carbon composite including a porous carbon material and a silicon coating layer positioned on the porous carbon material; a metal compound layer positioned on the silicon-carbon composite and including a metal compound that is metal oxide, metal nitride, or a mixture thereof; and a carbon coating layer surrounding the silicon-carbon composite and the metal compound layer positioned on the silicon-carbon composite.

14 Claims, 4 Drawing Sheets

(51) Int. Cl.

| | | |
|---|---|---|
| *H01M 4/04* | (2006.01) | |
| *H01M 4/36* | (2006.01) | |
| *H01M 4/48* | (2010.01) | |
| *H01M 4/583* | (2010.01) | |
| *H01M 10/0525* | (2010.01) | |

(52) U.S. Cl.
CPC ............. *H01M 4/366* (2013.01); *H01M 4/48* (2013.01); *H01M 4/583* (2013.01); *H01M 10/0525* (2013.01); *H01M 2004/021* (2013.01)

(56) References Cited

U.S. PATENT DOCUMENTS

2018/0337400 A1* 11/2018 Cho ...................... H01M 4/625
2019/0355980 A1* 11/2019 Holt ...................... H01M 4/625

OTHER PUBLICATIONS

Office Action for Korean Patent Application No. 10-2020-0160801 issued by the Korean Patent Office on Feb. 27, 2025.

* cited by examiner

ANODE ACTIVE MATERIAL FOR LITHIUM SECONDARY BATTERY AND METHOD OF PREPARING THE SAME

CROSS-REFERENCE TO RELATED APPLICATIONS

This application claims priority under 35 U.S.C. § 119 to Korean Patent Application No. 10-2020-0160801, filed on Nov. 26, 2020, in the Korean Intellectual Property Office, the disclosure of which is incorporated herein by reference in its entirety.

TECHNICAL FIELD

The following disclosure relates to an anode active material for a lithium secondary battery and a method of preparing the same, and in particular, to an anode active material for a lithium secondary battery having excellent lifespan stability and a method of preparing the same.

BACKGROUND

The performance improvement of a lithium secondary battery may be attributed to the development of an electrode material that has a decisive influence on various characteristics such as capacity and lifespan. In order to meet the needs of these markets, it is essential to develop an anode material capable of overcoming a capacity limitation of carbon materials such as graphite and implementing high energy density and high stability.

Oxides of inorganic-based anode materials such as silicon (Si), germanium (Ge), tin (Sn), or antimony (Sb) are anode alternative materials that are being developed to overcome a capacity limitation of carbon materials such as graphite and implement high energy density and high stability.

Among these inorganic-based anode materials, silicon-based anode materials have the advantage of having a very large amount of lithium bonding, but have disadvantages such as low electrical conductivity and large volume change during charging/discharging of the battery. For this reason, a lithium secondary battery including the silicon-based anode materials has disadvantages such as low cycle lifespan characteristics and a low capacity retention in spite of an excellent charge capacity, such that it is difficult to commercialize the lithium secondary battery including the silicon-based anode materials.

In order to overcome the above-mentioned problems, as in Korean Patent Laid-Open Publication No. 10-2017-0006164, a study was conducted to improve the capacity of the battery and the electrical conductivity of the anode by coating a carbon coating layer on a silicon surface, but there is still a problem with low lifespan stability.

RELATED ART DOCUMENT

Patent Document (Patent Document 1) Korean Patent Laid-Open Publication No. 10-2017-0006164 (Jan. 17, 2017)

SUMMARY

An embodiment of the present invention is directed to providing an anode active material for a lithium secondary battery having a high capacity and excellent lifespan stability as conventional anode alternative materials.

In one general aspect, an anode active material for a lithium secondary battery includes: a silicon-carbon composite including a porous carbon material and a silicon coating layer positioned on the porous carbon material; a metal compound layer positioned on the silicon-carbon composite and including a metal compound that is metal oxide, metal nitride, or a mixture thereof; and a carbon coating layer surrounding the silicon-carbon composite and the metal compound layer positioned on the silicon-carbon composite.

The porous carbon material may be a macroporous material having pores inside or on a surface thereof, or both inside and on the surface.

The pores may have a spherical shape, a truncated spherical shape, or a combination thereof, and may have an average size of 100 to 300 nm.

The anode active material may have a BET surface area of 10 to 100 $m^2/g$ and a pore volume of 0.01 to 0.1 $cm^3/g$.

The silicon coating layer may have a thickness of 1 to 30 nm.

The silicon of the silicon coating layer may be amorphous.

A metal in the metal compound layer may be one or more metals selected from cobalt (Co), nickel (Ni), titanium (Ti), manganese (Mn), chromium (Cr), iron (Fe), copper (Cu), zinc (Zn), and vanadium (V).

The nanoparticles of the metal compound layer may have a size of 5 to 15 nm.

The carbon coating layer may have a thickness of 1 to 30 nm.

In another general aspect, there is provided a method of preparing the anode active material for a lithium secondary battery as described above.

The method of preparing an anode active material for a lithium secondary battery according to the present invention includes: (a) preparing a carbon material by mixing a carbon source with a pore former and performing carbonization treatment; (b) preparing a macroporous carbon material including a plurality of pores inside or on a surface of the carbon material, or both inside and on the surface by removing the pore former from the carbon material; (c) preparing a silicon-carbon composite by forming a silicon coating layer on the macroporous carbon material through chemical vapor deposition; (d) preparing a metal-silicon-carbon composite in which a metal compound layer containing a metal compound that is metal oxide, metal nitride, or a mixture thereof is formed on a surface of a silicon-carbon composite by supplying a liquid metal precursor to the silicon-carbon composite and performing sintering; and (e) preparing an anode active material including a carbon-metal-silicon-carbon composite on which a carbon coating layer is formed on the metal-silicon-carbon composite by supplying a carbon precursor to the metal-silicon-carbon composite and performing heat treatment.

The sintering of step (d) may be performed at 300 to 600° C. under a nitrogen atmosphere.

The metal precursor of step (d) as described above may be chloride, sulfate, nitrate, acetate, hydroxide, oxide, or a mixture thereof of one or more metals selected from cobalt (Co), nickel (Ni), titanium (Ti), manganese (Mn), chromium (Cr), iron (Fe), copper (Cu), zinc (Zn), and vanadium (V).

Each of the carbon source of step (a) and the carbon precursor of step (e) may be one or more compounds selected from polymer, coal tar pitch, petroleum pitch, meso-phase pitch, isotropic pitch, coke, low molecular weight heavy oil, coal-based pitch, phenolic resin, naphthalene resin, epoxy resin, vinyl chloride resin, polyimide, polybenzimidazole, polyacrylonitrile, polyethylene glycol, polyvinyl alcohol, polyvinyl chloride, furfuryl alcohol, furan, cellulose, glucose, sucrose, acetic acid, malic acid, citric acid, organic acid, and derivatives thereof.

In another general aspect, there is provided a method of preparing the anode active material for a lithium secondary battery as described above.

DETAILED DESCRIPTION OF EMBODIMENTS

Figure 1:
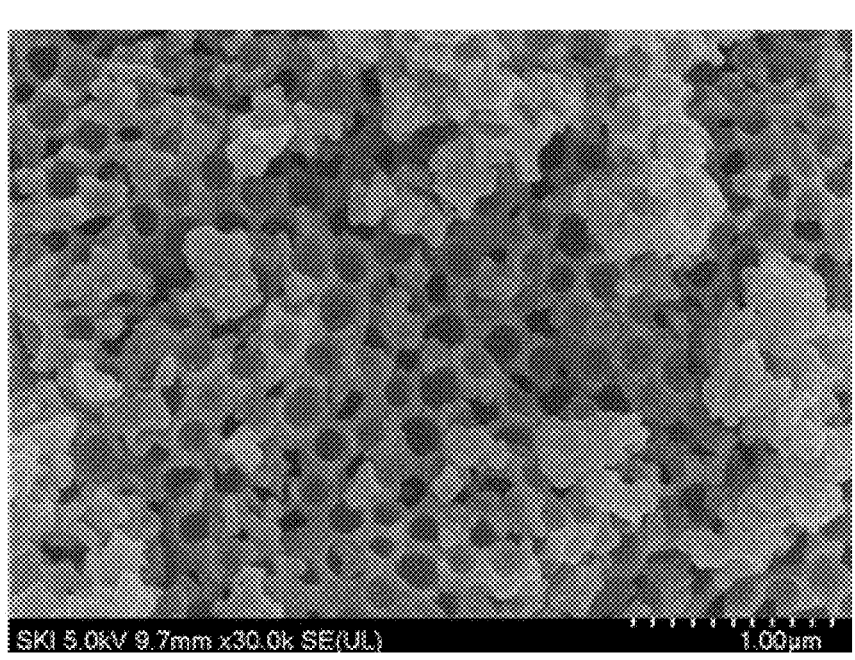
FIG. 1 is an SEM analysis result of a porous carbon material of Preparation Example 1.

Hereinafter, an anode active material for a lithium secondary battery of the present invention and a method of preparing the same will be described in detail with reference to the accompanying drawings. The drawings to be provided below are provided by way of example so that the spirit of the present invention can be sufficiently transferred to those skilled in the art. Therefore, the present invention is not limited to the accompanying drawings provided below, but may be modified in many different forms. In addition, the accompanying drawings suggested below will be exaggerated in order to clear the spirit and scope of the present invention. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description and the accompanying drawings. In addition, singular forms used in the detailed description and the claims are intended to include the plural forms unless otherwise indicated in context. Units used in the specification of the present invention and appended claims without special mention are by weight, and as an example, the unit of % or ratio means % by weight or ratio by weight, respectively.

There is provided an anode active material for a lithium secondary battery including a silicon-carbon composite including a porous carbon material and a silicon coating layer positioned on the porous carbon material; a metal compound layer positioned on the silicon-carbon composite and including a metal compound that is metal oxide, metal nitride, or a mixture thereof; and a carbon coating layer surrounding the silicon-carbon composite and the metal compound layer positioned on the silicon-carbon composite.

The anode active material for a lithium secondary battery according to the present invention is sequentially stacked with a porous carbon material-silicon coating layer-metal compound layer-carbon coating layer, such that the volume expansion of silicon may be suppressed during charging/discharging of the battery while including silicon in a high content. Accordingly, the lithium secondary battery including the anode active material for a lithium secondary battery according to the present invention has an advantage of having a high capacity and excellent lifespan stability.

The porous carbon material included in the anode active material for a lithium secondary battery according to the present invention may be particulates, for example, a spherical shape, an elliptical shape, a cone shape, a needle shape, or a fiber shape. As a practical example, the porous carbon material may have a spherical shape or an elliptical shape.

The anode active material for a lithium secondary battery may include a spherical or elliptical porous carbon material, thereby reducing the viscosity of the slurry, which is advantageous for slurry dispersion, preventing initial charging/discharging efficiency from being deteriorated, and increasing strength of the anode.

Such a porous carbon material may have an average particle size of 1 to 30 μm, specifically 5 to 20 μm, and more specifically 8 to 12 μm, and a BET surface area of 50 to 120 $m^2/g$, specifically, 70 to 100 $m^2/g$, and more specifically 80 to 95 $m^2/g$, and the pore volume of 0.08 to 0.25 $cm^3/g$, specifically 0.10 to 0.20 $cm^3/g$, and more specifically 0.12 to 0.16 $cm^3/g$.

In addition, the porous carbon material has pores inside or on a surface thereof, or both inside and on the surface, and may be macroporous in which the average size of the pores is 50 nm or more. Specifically, the porous carbon material may have an average pore size of 10 to 500 nm, specifically 50 to 400 nm, and more specifically 100 to 300 nm.

Furthermore, the shape of the pores included in the porous carbon material described above may be a sphere, a truncated sphere, or a combination thereof. Specifically, the pores on the surface of the porous carbon material may have the shape of a truncated sphere, and the pores inside the porous carbon material may have the shape of a sphere. When the pores inside the porous carbon material have the spherical shape, the pores may be regularly or irregularly filled with the porous carbon material. In an embodiment, the pores inside the porous carbon material may be filled with a regular arrangement in a structure such as HCP or FCC, but the present invention does not exclude pores having an irregular arrangement structure.

Since the porous carbon material included in the anode active material for a lithium secondary battery according to the present invention is macroporous and has larger pores, the structure of the pores may be maintained even if a large amount of silicon is contained in the pores.

In addition, the porous carbon material included in the anode active material for a lithium secondary battery according to the present invention also has pores inside and may act as buffer against the expansion of the composite anode active material during charging/discharging, thereby improving the long-term stability of the lithium secondary battery.

In the anode active material for a lithium secondary battery according to an exemplary embodiment of the present invention, the silicon of the silicon coating layer described above may be amorphous silicon, crystalline silicon, or a mixture thereof, and may be amorphous as a practical example. When silicon included in the anode active material is amorphous, structural change stress is less than that of crystalline silicon, so that volume expansion of the silicon layer during charging/discharging of a lithium secondary battery may be alleviated.

In an embodiment, the anode active material for a lithium secondary battery according to the present invention may include a silicon coating layer containing amorphous silicon to relieve volume expansion of the silicon layer during charging/discharging of a lithium secondary battery, and thus the charging/discharging characteristics may be improved.

The silicon coating layer described above may uniformly cover a surface including the surface of the porous carbon material described above and the surface of the pores, the inside of the pores, or both of the surface and the inside of the pores. For example, the silicon layer described above may have a constant thickness from the surface of the porous carbon structure described above.

In an embodiment, the thickness of the silicon coating layer described above may be 1 to 30 nm, specifically 3 to 20 nm, and more specifically 5 to 15 nm, but is not limited thereto. However, the thickness of the silicon coating layer described above is very thin compared to the silicon coating layer included in the conventional anode active material, and thus the anode active material for a lithium secondary battery according to the present invention may suppresses the volume expansion and exfoliation of the silicon layer during charging/discharging of the lithium secondary battery as compared to the conventional anode active material.

In addition, the silicon of the silicon coating layer described above may be further positioned in the pores inside of the porous carbon material, and thus a larger amount of silicon may be contained in spite of the thin thickness of the silicon coating layer. Accordingly, the lithium secondary battery containing the anode active material for a lithium battery according to the present invention may have an excellent capacity.

In addition, an anode active material for a lithium secondary battery according to the present invention may include a metal compound layer positioned on a silicon-carbon composite including a silicon layer positioned on a porous carbon material. In this case, the metal compound layer described above may be formed by dispersing the metal compound in the form of nanoparticles on the silicon-carbon composite described above.

In an embodiment, the size of the nanoparticles of the metal compound layer described above may be 5 to 15 nm, specifically 5 to 12 nm, more specifically 7 to 9 nm, but is not limited thereto. However, if the metal compound included in the anode active material for a lithium secondary battery according to the present invention is within the particle size range described above, it is preferable because the volume change of silicon may be minimized due to the high reactivity between the metal compound and lithium.

In an embodiment, the metal compound described above may be oxide, nitride, or a mixture thereof of one or more metals selected from cobalt (Co), nickel (Ni), titanium (Ti), manganese (Mn), chromium (Cr), iron (Fe), copper (Cu), zinc (Zn), and vanadium (V). As a practical example, the metal compound may be metal oxide, but is not limited thereto.

That is, the lithium secondary battery including the anode active material for a lithium secondary battery according to the present invention may include the metal oxide nanoparticles included in the metal compound layer positioned on the silicon-carbon composite described above to prevent the surface of silicon nanoparticles included in the silicon coating layer from being oxidized. Accordingly, during charging/discharging of the lithium secondary battery, capacity reduction due to the silicon oxide film may be prevented, and direct contact between silicon and the electrolyte may be prevented. Therefore, the anode active material for a lithium secondary battery according to the present invention includes the metal compound layer positioned on the silicon-carbon composite, and thus high capacity may be maintained even when the charging/discharging of the lithium secondary battery is repeated, and the problem of electrolyte depletion due to contact between silicon and electrolyte may be solved, thereby preventing deterioration of the lithium secondary battery.

The anode active material for a lithium secondary battery according to the present invention is preferable because it may have improved electrical conductivity by including a carbon coating layer on the outermost layer.

In an embodiment, the thickness of the carbon coating layer described above may be 1 to 30 nm, specifically 3 to 20 nm, and more specifically 5 to 15 nm, but is not limited thereto.

In terms of smoothly occluding and releasing lithium while satisfying both the properties and thickness ranges of the anode active material for a lithium secondary battery described above, the anode active material for a lithium secondary battery according to the present invention may include 20 to 70 parts by weight of a carbon material, 15 to 50 parts by weight of a silicon coating layer, 5 to 30 parts by weight of a metal compound, and 3 to 20 parts by weight of a carbon coating layer based on 100 parts by weight of the anode active material, and preferably 30 to 50 parts by weight of a carbon material, 20 to 40 parts by weight of a silicon coating layer, 10 to 30 parts by weight of a metal compound, and 5 to 15 parts by weight of a carbon coating layer based on 100 parts by weight of the anode active material.

Such an anode active material may have a BET surface area of 10 to 100 $m^2/g$, specifically 20 to 60 $m_2/g$, and more specifically 25 to 35 $m^2/g$, and a pore volume of 0.01 to 0.1 $cm^3/g$, specifically 0.02 to 0.08 $cm^3/g$, and more specifically 0.04 to 0.06 $cm^3/g$.

The present invention provides a lithium secondary battery including the anode active material for a lithium secondary battery described above.

Accordingly, the lithium secondary battery according to the present invention may include the anode active material having the properties described above in the anode, and thus stability may be guaranteed even when charging/discharging is repeated, volume expansion may be alleviated, and battery properties such as high capacity and lifespan characteristics of the lithium secondary battery may be improved.

In this case, when describing the lithium secondary battery according to the present invention, the specific structure and a preparing method of the lithium secondary battery described above are widely known in the art, and thus a minimal description thereof will be added.

In an embodiment, the lithium secondary battery described above may include an anode, a cathode, a separator, and an electrolyte containing the anode active material for a lithium secondary battery described above.

The anode described above may provide an anode for a lithium secondary battery including an anode current collector; and an anode active material layer containing the anode active material for a lithium secondary battery described above, an anode binder, and optionally an anode conductive material formed on the anode current collector.

The anode binder described above is a component that assists in bonding to an anode active material, a conductive material, or a current collector to be described later, and may be a water-insoluble binder, a water-soluble binder, or a combination thereof. Specifically, examples of the binder may include a water-insoluble binder such as polyvinyl chloride, carboxylated polyvinyl chloride, polyvinyl fluoride, a polymer containing ethylene oxide, polyvinylpyrrolidone, polyurethane, polytetrafluoroethylene, polyvinylidene fluoride, polyethylene, polypropylene, polyamideimide, polyimide or a combination thereof; a water-soluble binder such as styrene-butadiene rubber, acrylated styrene-butadiene rubber, polyvinyl alcohol, sodium polyacrylate, a copolymer of propylene, and an olefin having 2 to 8 carbon atoms, a copolymer of (meth)acrylic acid and (meth)acrylic acid alkyl ester, or a combination thereof; or a combination thereof.

The anode conductive material described above is a component that is optionally further included in order to further improve the electrical conductivity of the anode by providing a conductive path to the anode active material described above. For example, the conductive material may be any conductive material used for a conventional lithium secondary battery. Specifically, examples of the anode conductive material may include a carbon-based material such as natural graphite, artificial graphite, carbon black, acetylene black, ketjen black, or carbon fiber; metal-based material, such as metal powder or metal fiber made of copper, nickel, aluminum, silver, etc.; a conductive polymer such as polyphenylene derivatives; or a conductive material including a mixture thereof.

The anode current collector described above may be used without particular limitation as long as it has conductivity without causing chemical change in the lithium secondary battery. Example of the anode current collector may include be one in which copper, stainless steel, aluminum, nickel, titanium, sintered carbon, copper, or stainless steel are surface-treated with carbon, nickel, titanium, silver, etc., or aluminum-cadmium alloy. The anode current collector described above may be in the form of a film, a sheet, a foil, a net, a porous body, a foam, a non-woven body, etc., but the present invention is not limited thereto.

In an embodiment, the anode active material layer for a lithium secondary battery according to the present invention may have a thickness of 10 to 100 μm, specifically 20 to 80 μm, and more specifically 20 to 50 μm.

In terms of satisfying the thickness range of the anode active material layer described above, the anode for a lithium secondary battery according to the present invention may include 5 to 30 parts by weight of an anode binder and 5 to 30 parts by weight of an anode conductive material based on 100 parts by weight of the anode active material, and as a practical example, 10 to 15 parts by weight of an anode binder and 10 to 15 parts by weight of an anode conductive material.

Meanwhile, the cathode described above includes a cathode current collector and a cathode active material layer formed on the above-described cathode current collector, and the cathode active material layer described above includes a cathode active material, a cathode binder, and a cathode conductive material.

In an embodiment, the cathode active material described above may be one or more compounds mainly selected from lithium cobalt-based oxide, lithium manganese-based oxide, lithium nickel-based oxide, lithium composite oxide, etc., and specifically, a layered compound such as lithium cobalt oxide ($LiCoO_2$) or lithium nickel oxide ($LiNiO_2$), or a compound substituted with one or more transition metals; lithium manganese oxide represented by the formula $Li_{1+y}Mn_{2-y}O_4$ (where y=0 to 0.3), such as $LiMnO_3$, $LiMn_2O_3$, and $LiMnO_2$; lithium copper oxide ($Li_2CuO_2$); vanadium oxide such as $LiV_3O_8$, $LiFe_3O_4$, $V_2O_3$, and $Cu_3V_3O_7$; Ni site-type lithium nickel oxide represented by the formula $LiNi_{1-y}MyO_2$ (where M=Co, Mn, Al, Cu, Fe, Mg, B, or Ga, and y=0.01 to 0.3); lithium manganese complex oxide represented by the formula $LiMn_{2-y}MO_2$ (where M=Co, Ni, Fe, Cr, Zn, or Ta, and y=0.01 to 0.1) or $Li_2Mn_3MO_8$ (where M=Fe, Co, Ni, Fe, Cr, or Zn); $LiMn_2O_4$ in which some of Li in the formula are replaced with an alkaline earth metal ion; a disulfide compound; or $Fe_2(MnO_4)_3$, etc., but the present invention is not limited thereto.

The cathode binder described above serves to adhere cathode active material particles well to each other and adhere the cathode active material well to the current collector. A representative example of the cathode binder may include, but is not limited to, polyvinyl alcohol, carboxymethyl cellulose, hydroxylpropyl cellulose, diacetyl cellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene-butadiene rubber, acrylated styrene-butadiene rubber, an epoxy resin, nylon, etc.

The cathode conductive material described above is used to impart conductivity to the electrode, and any cathode conductive material may be used as the cathode conductive material as long as it does not cause a chemical change in a battery and is an electrically conductive material. Examples of the cathode conductive material may include natural graphite, artificial graphite, carbon black, acetylene black, ketjen black, carbon fiber, metal powder or metal fiber made of copper, nickel, aluminum, silver, etc. In addition, the conductive materials such as a polyphenylene derivative may be used alone or in combination with the above-mentioned material.

Al may be used as the cathode current collector described above, but the present invention is not limited thereto.

The thickness of the cathode active material layer may be 10 to 100 μm, specifically 20 to 80 μm, and more specifically 20 to 40 μm, but is not limited thereto.

In terms of satisfying the thickness range of the cathode active material layer described above, the cathode described above is 0.1 to 1.2 parts by weight of a cathode binder and 0.5 to 3 parts by weight of a cathode conductive material, and specifically 0.5 to 1.0 parts by weight of a cathode binder and 0.8 to 1.5 parts by weight of a cathode conductive material, based on 100 parts by weight of the cathode active material.

The anode and cathode described above may be manufactured by mixing each active material, a conductive material, and a binder in a solvent to prepare an active material composition, and applying the composition to a current collector. Since such an electrode manufacturing method is widely known in the art, a detailed description thereof will be omitted herein. Examples of the solvent described above may include, but are not limited to, N-methylpyrrolidone, etc.

The electrolyte included in the lithium secondary battery according to the present invention may be a lithium salt-containing non-aqueous-based electrolyte, and the non-aqueous-based electrolyte may include a non-aqueous electrolyte and a lithium salt.

Examples of the non-aqueous electrolyte described above may include aprotic organic solvents such as N-methyl-2-pyrrolidone, propylene carbonate, ethylene carbonate, butylene carbonate, dimethyl carbonate, diethyl carbonate, fluorinated ethylene carbonate, ethyl methyl carbonate, methylpropyl carbonate, ethylpropanoate, methyl acetate, ethyl acetate, propyl acetate, dimethyl ester, gamma-butylolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, triester phosphate, trimethoxy methane, dioxolane derivatives, sulfolane, methyl sulfolane, 1,3-dimethyl-2-imidazolidinone, propylene carbonate derivatives, tetrahydrofuran derivatives, ether, methyl pyropionate, or ethyl propionate.

Examples of the organic solid electrolyte described above may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride or polymers having an ionic dissociation group.

Examples of the inorganic solid electrolyte described above may include a nitride, halide, or sulfate of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$.

The lithium salt described above is a material that is easily dissolved in the non-aqueous-based electrolyte described above, and specific examples thereof may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)NLi$, lithium chloroborate, lower aliphatic lithium carboxylate, lithium tetraphenyl borate, or imide.

In addition, the non-aqueous electrolytes may include, for the purpose of improving charging/discharging characteristics and flame retardancy of the lithium secondary battery, for example, pyridine, triethyl phosphite, triethanolamine, cyclic ether, ethylene diamine, n-glyme, hexaphosphate triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride. In some cases, a halogen-containing solvent such as carbon tetrachloride or ethylene trifluoride may be further included in order to impart incombustibility, and carbon dioxide gas may be further included in order to improve high-temperature storage characteristics.

In this case, when a solid electrolyte such as a polymer is used as the electrolyte, of course, the solid electrolyte may also serve as a separator.

The lithium secondary battery according to the present invention may include a separator between the cathode and electrolyte, and the aforementioned separator may be an insulating thin film having high ion permeability and mechanical strength. For example, the separator may be an olefin-based polymer such as polypropylene having chemical resistance and hydrophobic property, a sheet or non-woven fabric made of glass fiber or polyethylene, etc., but is not limited thereto, and may be used in the form of a single layer or a composite layer.

The present invention includes a method of preparing the anode active material for a lithium secondary battery described above. Accordingly, the method of preparing an anode active material for a lithium secondary battery according to the present invention includes all contents for the anode active material for a lithium secondary battery described above.

A method of preparing an anode active material for a lithium secondary battery according to the present invention includes: (a) preparing a carbon material by mixing a carbon source with a pore former and performing carbonization treatment; (b) preparing a macroporous carbon material including a plurality of pores inside or on a surface of the carbon material, or both inside and on the surface by removing the pore former from the carbon material described above; (c) preparing a silicon-carbon composite by forming a silicon coating layer on the macroporous carbon material described above through chemical vapor deposition; (d) preparing a metal-silicon-carbon composite in which a metal compound layer containing a metal compound that is a metal oxide, a metal nitride, or a mixture thereof is formed on a surface of a silicon-carbon composite described above by supplying a liquid metal precursor to the silicon-carbon composite described above and performing a sintering treatment; and (e) preparing an anode active material including a carbon-metal-silicon-carbon composite on which a carbon coating layer is formed on the metal-silicon-carbon composite by supplying a carbon precursor to the metal-silicon-carbon composite described above and performing heat treatment.

In this case, each of the carbon source in step (a) described above and the carbon precursor in step (e) described above may be used without limitation as long as they may form a carbon structure (carbon material) by firing, and may be used in the field of the lithium secondary battery. Examples of the carbon source and the carbon precursor may be one or more compounds selected from polymers, coal tar pitch, petroleum pitch, meso-phase pitch, isotropic pitch, coke, low molecular weight heavy oil, coal-based pitch, phenolic resin, naphthalene resin, epoxy resin, vinyl chloride resin, polyimide, polybenzimidazole, polyacrylonitrile, polyethylene glycol, polyvinyl alcohol, polyvinyl chloride, furfuryl alcohol, furan, cellulose, glucose, sucrose, acetic acid, malic acid, citric acid, organic acids, and derivatives thereof. Specifically, the carbon source in step (a) and the carbon precursor in step (e) described above may be petroleum-based pitch, coal-based pitch, or a mixture thereof. In this case, the carbon source in step (a) and the carbon precursor in step (e) may be the same as or different from each other.

The pore former in step (a) may be used without limitation as long as it is an inorganic material that is not removed during carbonization and remains, but may be silicon oxide as a practical example.

In step (a), a mixing ratio of the carbon source and the pore former may be adjusted without being limited in terms of satisfying the ranges of the BET surface area and pore volume of the porous carbon material described above. For example, the mixing ratio of the carbon source:the pore former may be 1:0.1 to 1, specifically 1:0.1 to 0.8, and more specifically 1:0.3 to 0.8, but is not limited thereto.

In step (a), a dispersing agent may be further included so that the pore former is uniformly dispersed. For example, the dispersant may be any known dispersing agent for dispersing the pore former. Examples of the dispersant may include, but are not limited to, surfactants or block copolymers.

The carbonization treatment of step (a) may be carried out at a temperature of 200 to 1500° C., specifically 500 to 1200° C., and more specifically 800 to 1000° C. for 30 minutes to 10 hours, specifically 1 to 7 hours, and more specifically, 1 to 5 hours under an inert gas atmosphere such as argon or nitrogen, but is not limited thereto.

Meanwhile, the average pore size of the macroporous carbon material in step (b) may be controlled by the average particle diameter of the pore former mixed in step (a), and the average particle diameter of the pore former described above may be 100 to 500 nm, and specifically 200 to 300 nm.

In step (b), a method of removing the pore former may be used without limitation as long as it is a method capable of selectively removing the pore former from the carbon material described above.

For example, when the pore former is silicon oxide, silicon oxide, which is a pore former, may be selectively removed by etching from the carbon material by immersing the carbon material in NaOH, etc.

In step (c), the silicon precursor for the chemical vapor deposition of step (c) may be easily selected by a person skilled in the art from among those available in the art as long as it is capable of releasing Si atoms by gasification. Specifically, the silicon precursor may be silane ($SiH_4$), dichlorosilane ($SiH_2Cl_2$), silicon tetrafluoride ($SiF_4$), silicon tetrachloride ($SiCl_4$), methylsilane ($CH_3SiH_3$), disilane ($Si_2H_6$), or a combination thereof.

The chemical vapor deposition of step (c) may be carried out under an inert gas atmosphere such as argon or nitrogen.

In this case, of course, the temperature, deposition rate, and time of chemical vapor deposition may be adjusted in terms of satisfying the thickness range of the silicon coating layer described above.

Step (d) described above may be divided into a step of (d-1) preparing a liquid metal precursor; (d-2) dispersing the silicon-carbon composite described above in the liquid metal precursor and then performing sintering.

Step (d-1) may be carried out by melting the metal precursor or dispersing metal precursor in a solvent. In this case, the melting may be carried out at a temperature of 50 to 300° C., specifically 50 to 200° C., and more specifically 80 to 150° C. for 10 minutes to 10 hours, specifically 30 minutes to 5 hours, and more specifically 1 hour to 5 hours, but the present invention is not limited thereto. In addition, when a liquid metal precursor is prepared by dispersing the metal precursor in a solvent, distilled water may be used as the solvent, but the present invention is not limited thereto.

The metal precursor in step (d-1) may be chloride, sulfate, nitrate, acetate, hydroxide, oxide, or a mixture thereof of one or more metals selected from cobalt (Co), nickel (Ni), titanium (Ti), manganese (Mn), chromium (Cr), iron (Fe), copper (Cu), zinc (Zn), and vanadium (V).

In step (d-2), the sintering may be carried out at a temperature of 180 to 700° C., specifically 200 to 650° C., and more specifically 250 to 450° C. for 10 minutes to 10 hours, specifically 30 minutes to 5 hours, and more specifically 1 hour to 5 hours under an inert gas atmosphere such as argon or nitrogen. If the sintering temperature of the metal compound is within the temperature range described above, the metal compound may be grown into nano-sized crystals while preventing crystallization of the silicon deposited in step (c). In this case, the metal compound may have a particle size of 5 to 15 nm, specifically 5 to 12 nm, and more specifically 7 to 9 nm.

In step (e), the heat treatment, in terms of satisfying the thickness range of the carbon coating layer described above, may be carried out at a temperature of 180 to 700° C., specifically 200 to 650° C., and more specifically 250 to 450° C. for 10 minutes to 10 hours, specifically 30 minutes to 5 hours, and more specifically 1 hour to 5 hours under an inert gas atmosphere, but the present invention is not limited thereto.

(Preparation Example 1) Preparation of Porous Carbon Material

First, after dispersing 70 wt % of silica ($SiO_2$) particles having an average particle diameter of 250 nm and 30 wt % of pitch (viscosity at 25° C.: $\geq 10^5$ cP) without a solvent, a high-energy-based mechanical stirring process was performed to obtain a precursor. The precursor was fired at 900° C. for 1 hour under a nitrogen ($N_2$) atmosphere to prepare a carbon material.

Next, the carbon material was stirred in a 3 M NaOH solution for 6 hours to remove the silica by etching to prepare a macroporous carbon material having an average pore size of 200 nm.

(Preparation Example 2) Preparation of Silicon-Carbon Composite

The macroporous carbon material obtained in Preparation Example 1 was chemically vapor-deposited at 600° C. under a mixed gas ($SiH_4$ (g):$C_2H_4$ (g)=500:40 sccm) and inert atmosphere ($N_2$) to prepare a silicon-porous carbon composite in which a silicon layer was formed on the macroporous carbon material.

(Example 1) Preparation of Anode Active Material for Lithium Secondary Battery Including Carbon-Metal-Silicon-Carbon Composite First, 1 g of $Fe(NO_3)_2 6H_2O$ was melted in an oven at 100° C. in a solvent free manner to obtain a metal precursor solution.

Next, 1.5 g of the silicon-carbon composite obtained in Preparation Example 2 was impregnated with the metal precursor solution so that the metal precursor may be dispersed in the pores, and then sintered at 350° C. for 3 hours under a nitrogen gas atmosphere to prepare a metal-silicon-carbon composite in which a metal oxide is formed in a silicon-carbon composite.

Finally, 2 g of the metal-silicon-carbon composite and 0.2 g of pitch were mixed at 5000 rpm for 5 minutes through a high-energy-based mechanical stirring process, and then heat treatment was performed at 350° C. for 3 hours under a nitrogen gas atmosphere to prepare a carbon-metal-silicon-carbon composite in which a carbon layer is formed on a metal-silicon-carbon composite.

(Example 2) Lithium Secondary Battery Including Anode Active Material of Example 1

First, after preparing an anode slurry to have a weight ratio of the anode active material prepared in Example 1:conductive material:binder of 80:10:10, the anode slurry was applied on a copper current collector having a thickness of 60 μm using a conventional method. The current collector coated with the slurry was dried at room temperature, dried at 100° C. for 10 hours under a vacuum atmosphere, and then rolled with a roll press and punched in a size of 16 pi (Φ) to prepare an anode to be applied to a lithium secondary battery.

Next, a CR2016 coin-type half cell was manufactured by using the anode plate manufactured as described above, a lithium foil as a counter electrode, a porous polyethylene film as a separator, and a liquid electrolyte in which $LiPF_6$ is dissolved at a concentration of 1.3 M in a solvent in which ethylene carbonate and diethyl carbonate (DEC) are mixed at a volume ratio of 3:7 and fluoro-ethylene carbonate (FEC) is contained in 10 wt %, according to a commonly known preparing process.

(Comparative Example 1) Preparation of Anode Active Material for Lithium Secondary Battery Including Carbon-Silicon-Carbon Composite A carbon-silicon-carbon composite in which a carbon layer was formed on a silicon-carbon composite was prepared in the same manner as that in Example 1, except that the preparing of the metal-silicon-carbon composite in which the metal oxide is formed on the surface of the silicon-carbon composite was not performed in Example 1.

(Comparative Example 2) Lithium Secondary
Battery Including Anode Active Material of
Comparative Example 1

A lithium secondary battery of Comparative Example 2
was manufactured in the same manner as that in Example 2,
except that in Example 2, the anode active material of
Comparative Example 1 was used instead of the anode
active material of Example 1.

(Experimental Example 1) Analysis of Physical
Properties

In order to analyze a specific surface area and pore
volume of a specimen, a nitrogen adsorption/desorption
experiment was performed. The nitrogen adsorption/desorp-
tion experiment was carried out in a relative pressure ($P/P_0$)
range of 0.0 to 1.0 at 350° C. under a nitrogen atmosphere
using a BET specific surface area analysis equipment
(Brunauer Emmett Teller, BET). In this case, a specific
surface area (SBET) was calculated using a Brunauer-
Emmett-Teller (BET) equation, and a total pore volume (Vt)
was calculated from the amount of nitrogen adsorbed at
$P/P_0=0.99$.

The microstructure of the specimen was analyzed using a
scanning electron microscope (SEM) and energy dispersive
spectroscopy (EDS).

The crystallinity of the specimen was analyzed using an
X-ray diffractometer (XRD).

(Experimental Example 2) Evaluation of Output
Characteristics of Lithium Secondary Battery In order to evaluate the output characteristics of the half
cells manufactured in Example 2 and Comparative Example
2, the charging/discharging test of each half cell was
repeated a total of 53 times, and an initial efficiency and
capacity retention ratio (CRR)) were analyzed. The charg-
ing/discharging test was performed while charging the
lithium secondary battery by applying a constant current of
a rate of 0.1 or 0.5 C until a battery voltage reaches 0.01 V
(vs. Li) and applying a constant voltage until a current
reaches 0.01 C when the battery voltage reaches 0.01 V (vs.
Li) and discharging the lithium secondary battery by apply-
ing a constant current of 0.1 or 0.5 C until the voltage
reaches 1.5 or 1.0 V, using a lithium secondary battery
charger/discharger at 25° C. In this case, the initial efficiency
and capacity retention rate were calculated through the
following equation.

Initial efficiency (%)=discharge capacity in first
cycle/charge capacity in first cycle×100

Capacity retention rate (%)=(discharge capacity in
each cycle/discharge capacity in the first
cycle)×100

After carrying out the nitrogen adsorption/desorption
analysis of Example 1, Comparative Example 1, and Prepa-
ration Example 1, the results of the BET specific surface area
and total pore volume of Example 1, Comparative Example
1, and Preparation Example 1 calculated through the analy-
sis are listed in Table 1. It can be seen from Table 1 that the
porous carbon material of Preparation Example 1 has a BET
surface area of 88.5 $m^2$/g, which indicates that the porous
carbon material of Preparation Example 1 hardly contain
micropores of 10 nm or less. Meanwhile, it can be seen that
in Example 1, the BET specific surface area and pore volume
were higher than those of Comparative Example 1 as the metal oxide ($Fe_3O_4$) was further included on a silicon (Si)
layer, although the BET specific surface area and pore
volume were reduced in a process of forming the Si layer on
the surface and pores of the porous carbon material in
Example 1.

TABLE 1

| Division | Example 1 | Com. Example 1 | Preparation Example 1 |
|---|---|---|---|
| BET specific surface area ($m^2$/g) | 30 | 21 | 88.5 |
| Total pore volume ($cm^3$/g) | 0.05 | 0.04 | 0.14 |

FIG. 1 is an SEM analysis result of a porous carbon
material of Preparation Example 1. It can be observed from
FIG. 1 that the porous carbon material of Preparation
Example 1 is macroporous carbon material having an aver-
age pore size of 100 to 200 nm. In particular, it can be seen
that the porous carbon material of Preparation Example 1
does not include pores having a size of 10 nm or less.

Figure 2A:
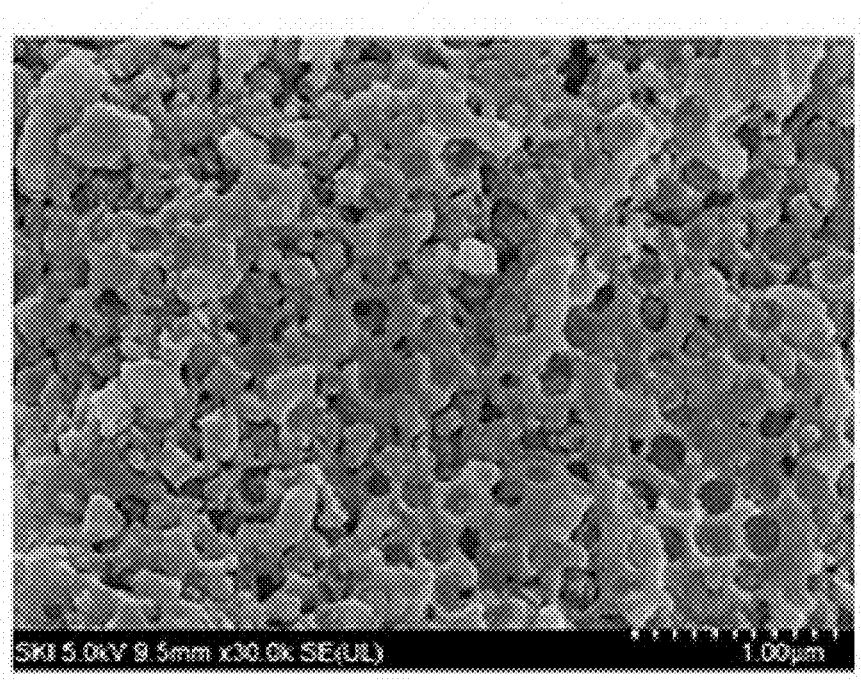
FIG. 2A is SEM analysis result of Example 1.
Figure 2B:
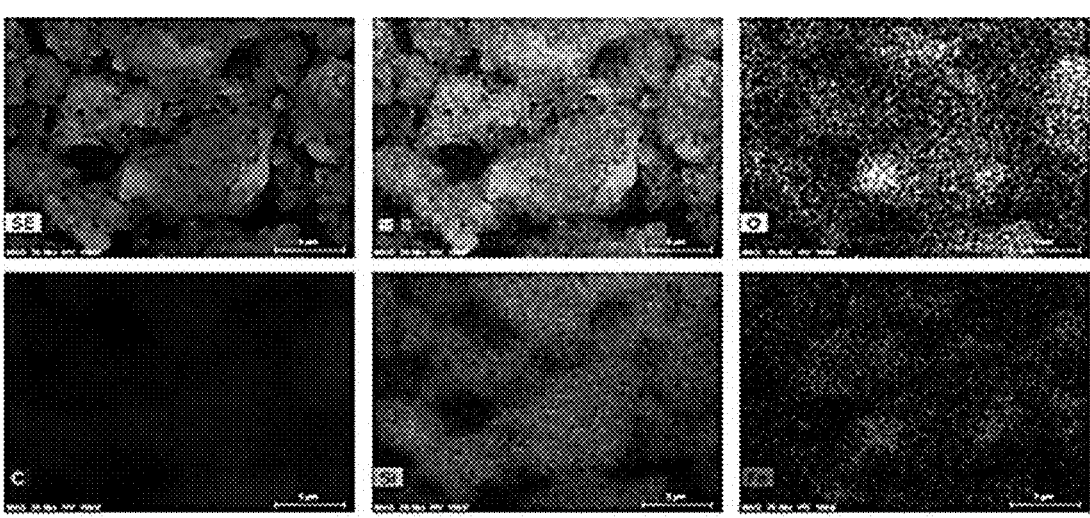
FIG. 2B is EDS analysis result of Example 1.

FIG. 2A is SEM analysis result of Example 1 and FIG. 2B
is EDS analysis result of Example 1. It can be observed from
the analysis results that the surface and pores of the porous
carbon material are mostly covered or filled with silicon and
iron oxide.

Figure 3:
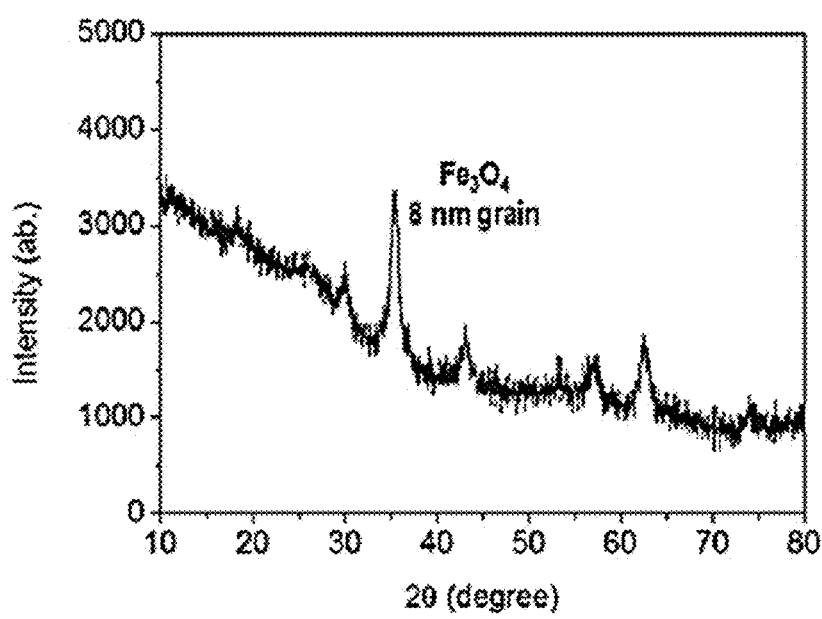
FIG. 3 is an XRD analysis result of Example 1.

FIG. 3 is an XRD analysis result of Example 1. It can be
seen from FIG. 3 that the peak of the $Fe_3O_4$ crystal phase is
observed, whereas the peak of Si crystal is not observed. It
can be seen from the observation result that Si in the Si layer
including the anode active material of Example 1 is amor-
phous. Meanwhile, the particle size of $Fe_3O_4$ was calculated
through a Scherrer's equation, and the calculated particle
size of $Fe_3O_4$ was about 8 nm.

Figure 4:
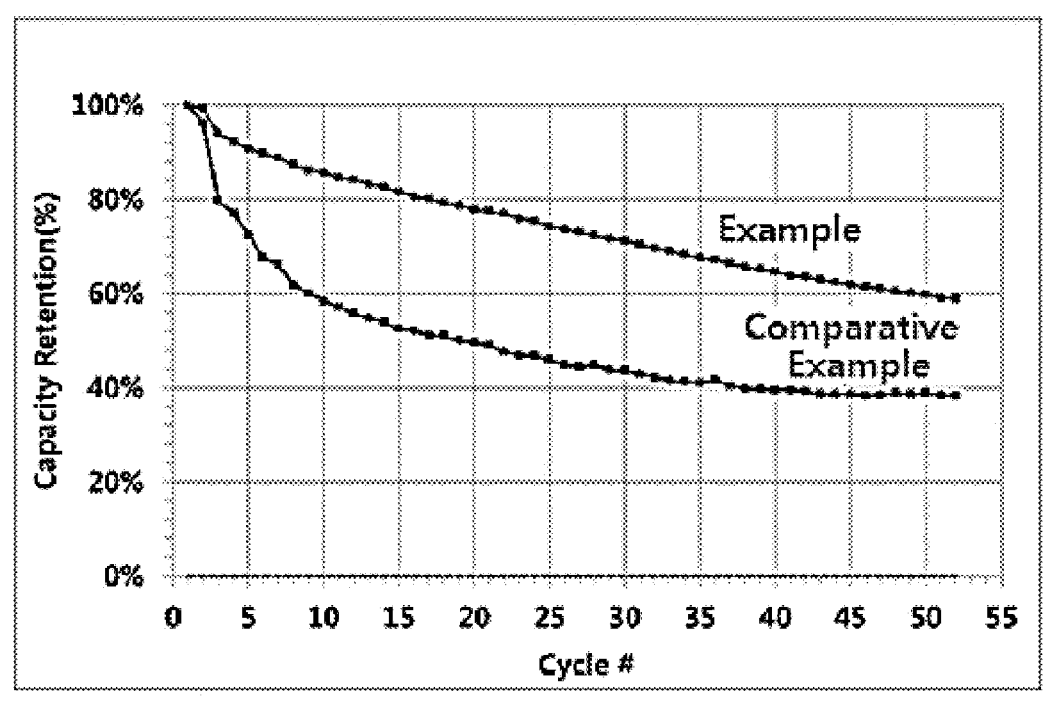
FIG. 4 is an output characteristic analysis result of Example 2 and Comparative Example 2.

FIG. 4 is an output characteristic analysis result of
Example 2 and Comparative Example 2, and the results are
summarized and shown in Table 2. It can be seen from FIG.
4 that the initial charging capacities of Example 2 and
Comparative Example 2 were 1848 mAh/g and 1805 mAh/
g, respectively, indicating that the initial charging capacity
of Example 2 was higher. In particular, it can be seen that,
while the capacity retention rate of Comparative Example 2
is rapidly reduced to 79.7% during the initial three cycles,
the capacity retention rate of Example 2 is slightly reduced
to 94%. Furthermore, it can be seen that after a total of 53
charge/discharge tests, the capacity retention rates of
Example 2 and Comparative Example 2 were 59% and
38.3%, respectively, indicating that the lithium secondary
battery of Example 2 had a significantly high capacity
retention rate.

TABLE 2

| Performance | Example 2 | Com. Example 2 |
|---|---|---|
| $1^{st}$ charge capacity (mAh/g) | 1848 | 1805 |
| $1^{st}$ discharge capacity (mAh/g) | 1592 | 1601 |
| Initial efficiency (%) | 86.1 | 88.5 |
| $3^{rd}$ capacity retention rate (%) | 94.0 | 79.7 |
| $53^{rd}$ capacity retention rate (%) | 59.0 | 38.3 |

The anode active material for a lithium secondary battery according to the present invention is sequentially stacked with a porous carbon material-silicon coating layer-metal compound layer-carbon coating layer, such that the volume expansion of silicon may be suppressed during charging/discharging of the battery while including silicon in a high content Accordingly, the lithium secondary battery including the anode active material for a lithium secondary battery according to the present invention has an advantage of having a high capacity and excellent lifespan stability.

Hereinabove, although the present invention has been described by specific matters, the limited embodiments and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. An anode active material for a lithium secondary battery, comprising:

a silicon-carbon composite including a porous carbon material and a silicon coating layer positioned on the porous carbon material;

a metal compound layer positioned on the silicon-carbon composite and including a metal compound that is metal oxide, metal nitride, or a mixture thereof, and a carbon coating layer surrounding the metal compound layer positioned on the silicon-carbon composite, wherein the metal compound in the metal compound layer is in a form of nanoparticles having a size of 5 to 15 nm, wherein the anode active material comprises 20 to 70 parts by weight of the porous carbon material, 15 to 50 parts by weight of the silicon coating layer, 5 to 30 parts by weight of the metal compound, and 3 to 20 parts by weight of the carbon coating layer based on 100 parts by weight of the anode active material, and wherein the carbon coating layer is the outermost layer of the anode active material.

2. The anode active material for a lithium secondary battery of claim 1, wherein the porous carbon material is a macroporous material having pores inside or on a surface thereof, or both inside and on the surface.

3. The anode active material for a lithium secondary battery of claim 2, wherein the pores have a spherical shape, a truncated spherical shape, or a combination thereof, and have an average size of 100 to 300 nm.

4. The anode active material for a lithium secondary battery of claim 1, wherein the anode active material has a BET surface area of 10 to 100 m2/g and a pore volume of 0.01 to 0.1 cm3/g.

5. The anode active material for a lithium secondary battery of claim 1, wherein the silicon coating layer has a thickness of 1 to 30 nm.

6. The anode active material for a lithium secondary battery of claim 1, wherein silicon of the silicon coating layer is amorphous.

7. The anode active material for a lithium secondary battery of claim 1, wherein a metal of the metal compound in the metal compound layer is one or more metals selected from cobalt (Co), nickel (Ni), titanium (Ti), manganese (Mn), chromium (Cr), iron (Fe), copper (Cu), zinc (Zn), and vanadium (V).

8. The anode active material for a lithium secondary battery of claim 1, wherein the carbon coating layer has a thickness of 1 to 30 nm.

9. A method of preparing the anode active material for a lithium secondary battery of claim 1, the method comprising:

(a) preparing a carbon material by mixing a carbon source with a pore former and performing carbonization treatment;

(b) preparing a macroporous carbon material including a plurality of pores inside or on a surface of the carbon material, or both inside and on the surface by removing the pore former from the carbon material;

(c) preparing a silicon-carbon composite by forming a silicon coating layer on the macroporous carbon material through chemical vapor deposition;

(d) preparing a metal-silicon-carbon composite in which a metal compound layer containing a metal compound that is metal oxide, metal nitride, or a mixture thereof is formed on a surface of the silicon-carbon composite by supplying a liquid metal precursor to the silicon-carbon composite and performing sintering; and (e) preparing an anode active material including the carbon-metal-silicon-carbon composite on which a carbon coating layer is formed on the metal-silicon-carbon composite by supplying a carbon precursor to the metal-silicon-carbon composite and performing heat treatment.

10. The method of claim 9, wherein the sintering of step (d) is performed at 300 to 600° C. under a nitrogen atmosphere.

11. The method of claim 9, wherein the metal precursor of step (d) is chloride, sulfate, nitrate, acetate, hydroxide, oxide, or a mixture thereof of one or more metals selected from cobalt (Co), nickel (Ni), titanium (Ti), manganese (Mn), chromium (Cr), iron (Fe), copper (Cu), zinc (Zn), and vanadium (V).

12. The method of claim 9, wherein each of the carbon source of step (a) and the carbon precursor of step (e) is one or more compounds selected from polymers, coal tar pitch, petroleum pitch, meso-phase pitch, isotropic pitch, coke, low molecular weight heavy oil, coal-based pitch, phenolic resin, naphthalene resin, epoxy resin, vinyl chloride resin, polyimide, polybenzimidazole, polyacrylonitrile, polyethylene glycol, polyvinyl alcohol, polyvinyl chloride, furfuryl alcohol, furan, cellulose, glucose, sucrose, acetic acid, malic acid, citric acid, organic acid, and derivatives thereof.

13. A lithium secondary battery, comprising the anode active material of claim 1.

14. The anode active material for a lithium secondary battery of claim 1, wherein a metal of the metal compound in the metal compound layer is one or more metals selected from cobalt (Co), nickel (Ni), manganese (Mn), iron (Fe), copper (Cu), zinc (Zn), and vanadium (V).

* * * * *